(12) United States Patent
Lohweg

(10) Patent No.: US 7,483,573 B2
(45) Date of Patent: Jan. 27, 2009

(54) METHOD FOR EVALUATING THE SIGNALS OF AN ELECTRONIC IMAGE SENSOR DURING PATTERN RECOGNITION OF IMAGE CONTENTS IN A TEST PIECE

(75) Inventor: Volker Lohweg, Bielefeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 728 days.

(21) Appl. No.: 10/522,590

(22) PCT Filed: Jul. 22, 2003

(86) PCT No.: PCT/DE03/02467

§ 371 (c)(1),
(2), (4) Date: Jan. 26, 2005

(87) PCT Pub. No.: WO2004/017252

PCT Pub. Date: Feb. 26, 2004

(65) Prior Publication Data

US 2006/0050995 A1    Mar. 9, 2006

(30) Foreign Application Priority Data

Jul. 26, 2002    (DE) .................. 102 34 086

(51) Int. Cl.
*G06K 9/62* (2006.01)
(52) U.S. Cl. .................. 382/224; 382/280; 382/281
(58) Field of Classification Search .................. 382/224
See application file for complete search history.

(56) References Cited

U.S. PATENT DOCUMENTS

| | | |
|---|---|---|
| 5,602,938 A | 2/1997 | Akiyama et al. |
| 6,002,807 A * | 12/1999 | Guerci .................. 382/278 |
| 7,050,629 B2 * | 5/2006 | Jackson et al. .............. 382/173 |
| 7,187,810 B2 * | 3/2007 | Clune et al. .................. 382/294 |
| 7,349,583 B2 * | 3/2008 | Kumar et al. ............... 382/294 |

(Continued)

OTHER PUBLICATIONS

Gath et al., "Unsupervised Optimal Fuzzy Clustering", Jul. 1989, IEEE, IEEE Transactions on Pattern Analysis and Machine Intelligence, vol. 11, No. 7, pp. 773-781.*

(Continued)

*Primary Examiner*—Matthew C. Bella
*Assistant Examiner*—Sath V. Perungavoor
(74) *Attorney, Agent, or Firm*—Jones, Tullar, Cooper, PC

(57) ABSTRACT

Signals generated by an electronic image sensor, during pattern recognition of image contents in a test piece, are evaluated. The image sensor receives an input light signal and emits an electrical output signal that correlates with the input light signal. The image content of a window, having a size of n×n pixels, is analyzed. The output signals that are either directly or indirectly emitted by the image sensor are transformed into at least one translationally invariant characteristic value by the use of at least one calculation specification. This characteristic value is weighted by at least one fuzzy matching function which correlates with the value range of the characteristic value. A higher-order fuzzy matching function is generated by linking all of the matching functions by use of a calculation specification including at least one rule. A sympathy value is determined from the higher-order fuzzy matching function. That sympathy value is compared with a threshold value. A decision is then made from this comparison regarding association with a class.

12 Claims, 5 Drawing Sheets

U.S. PATENT DOCUMENTS

| | | | |
|---|---|---|---|
| 2002/0039446 | A1 | 4/2002 | Santoni |
| 2003/0048924 | A1* | 3/2003 | Petitjean .................... 382/100 |
| 2004/0022436 | A1* | 2/2004 | Patti et al. .................. 382/191 |
| 2004/0190762 | A1* | 9/2004 | Dowski et al. .............. 382/128 |
| 2004/0228502 | A1* | 11/2004 | Bradley et al. .............. 382/100 |
| 2006/0050995 | A1* | 3/2006 | Lohweg ....................... 382/312 |
| 2008/0118105 | A1* | 5/2008 | Friedhoff et al. ............ 382/103 |

OTHER PUBLICATIONS

Rimey et al., "A Maximum-Likelihood Approach to Segmenting Range Data", Jun. 1988, IEEE, IEEE Journal of Robotics and Automation, vol. 4, No. 3, pp. 277-286.*

Setnes, "Supervised Fuzzy Clustering for Rule Extraction", Aug. 2000, IEEE, IEEE Transactions on Fuzzy Systems, vol. 8, No. 4, pp. 416-424.*

Wong et al., "K-Means-Based Fuzzy Classifier Design", 2000, IEEE, Fuzz IEEE 2000, the Ninth IEEE International Conference on, vol. 1, pp. 48-52.*

"Handwritten Character Recognition using Fuzzy Logic," S. Sasi and J. S. Bedi; Dept. of Elect. & Comp. Eng., Wayne State U., Detroit, MI Mar. 8, 1994.

"Position, Rotation, and Scale Invariant Recognition of Images Using Higher-Order Spectra," V. Chandran and S. L. Elgar; IEEE, Mar. 23, 1992.

"Fuzzy Pyramid-Based Invariant Object Recognition," X. Liu, S. Tan, V. Srinivasan, S.H. Ong, W. Xie; May 27, 1994, No. 5, Head.Hill Hall, Oxfor, GB; Pattern Recognition, vol. 27, No. 5, pp. 741-756.

"Fuzzy Quaternion Approach to Object Recognition Incorporating Zer-nike Moment Invariants," K.N. Ngan, S.B. Kang; IEEE, 10th Int'l Conf. on Pattern Recognition, Jun. 1990.

"Mustererkennung mit Fuzzy-Logik—Analysieren, klassifizieren, erk-ennen und diagnostizieren," Thomas Tilli; 1993 Franzis-Verlag GmbH, Munchen.

"Mustererkennung mit Fuzzy-Logik," Peter Arnemann; Elektronik 22/ 1991.

"A Fuzzy ARTMAP Based Classification Technique of Natural Textures," D. Charalampidis, M. Georgiopoulos, T. Kasparis, J. Rolland; 1999 IEEE.

"Ein generalisiertes Verfahren zur Berechnung von translationsinvarianten Zirkulartransformationen fur die Anwendung in der Signal- und Bildverarbeitung," V. Lohweg, D. Muller; Mustererkennung 2000.

* cited by examiner

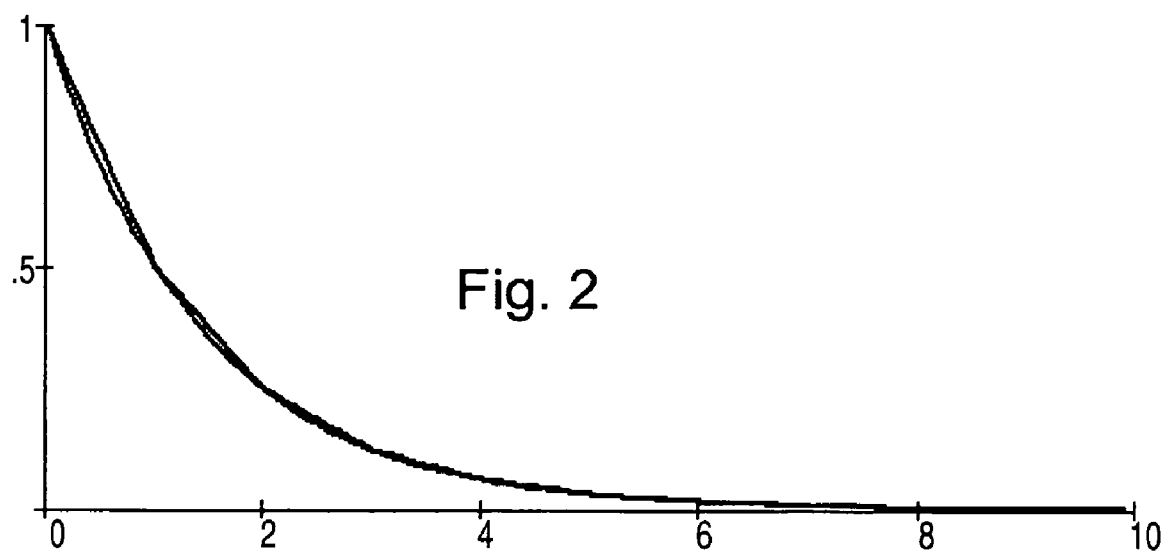

METHOD FOR EVALUATING THE SIGNALS OF AN ELECTRONIC IMAGE SENSOR DURING PATTERN RECOGNITION OF IMAGE CONTENTS IN A TEST PIECE

CROSS REFERENCE TO RELATED APPLICATIONS

This U.S. patent application is the U.S. national phase, under 35 U.S.C. 371 of PCT/DE2003/002467, filed Jul. 22, 2003; published as WO 2004/017252A1 on Feb. 26, 2004, and claiming priority to DE 102 34 086.2 filed Jul. 26, 2002, the disclosures of which are expressly incorporated herein by reference.

FIELD OF THE INVENTION

The present invention is directed to methods for signal evaluation of an electronic image sensor in the course of pattern recognition of the image contents of a test body. The image sensor receives a light input signal and emits an electrical output signal which correlates with the light input signal.

BACKGROUND OF THE INVENTION

Known methods for analyzing the image contents of a test body are mainly based on metrics for determining similarities, such as distance measurements of segmented objects, or the calculation of global threshold distributions. These methods are based on translatorily invariable initial spectra. Situations often occur in reality, such as object displacements underneath the recording system, or different backgrounds during recording, or aliasing effects, so that in many cases a direct comparison of these initial spectra cannot be performed.

It is known from the reference book of Thomas TILLI, "Mustererkennung mit Fuzzy-Logik: Analysieren, klassifizieren, erkennen und diagnostizieren" [Pattern Recognition by Means of Fuzzy Logic: Analyzing, Classifying, Determining and Diagnosing], Franzis-Verlag GmbH, München, publishers, 1993, pp. 183/184, 208 to 210, 235 to 257, to use fuzzy logic for image processing, wherein a spectral transformation can be one type of signal preparation.

The technical article "Mustererkennung mit Fuzzy-Logik" [Pattern Recognition by Means of Fuzzy Logic] by Peter ARNEMANN, Elektronik 22/1992, pages 88 to 92, describes how to perform pattern recognition by the use of fuzzy logic.

The article by D. Charalampidis, T. Kasparis, M. Georgiopoulos, J. Rolland "A Fuzzy ARTMAP-Based Classification Technique of Natural Textures", Fuzzy Information Processing Society, 1999, NAFIPS, 18th International Conference of the North American Fuzzy Information Processing Society, Jun. 10 to 12 1999, pp. 507 to 511, describes the performance of pattern recognition with a training phase and the use of a window of 16×16 pixels for image recognition.

The publication "Volker Lohweg and Dietmar Müller: Ein generalisiertes Verfahren zur Berechnung von translationsinvarianten Zirkulartransformationen für die Anwendung in der Signal-und Bildverarbeitung" [A Generalized Method for Calculating Translation-invariant Circular Transformations for Employment in Signal and Image Processing], Mustererkennung [Pattern Recognition] 2000, $22^{nd}$ DAGM Symposium, 09/13 to 15/2000, pages 213 to 220" describes the mathematical bases and the application of circular transformation in image processing.

USP 0,039,446/2002 discloses a method for comparing two patterns by the use of classification methods.

SUMMARY OF THE INVENTION

The object of the present invention is directed to providing methods for signal evaluation of an electronic image sensor in the course of pattern recognition of the image contents of a test body.

In accordance with the invention, this object is attained by generating a multiple pixel output signal with the image sensor. The output signal comprises an n×n pixel window within an image of the test body, whose contents are analyzed. The output signal is converted into at least one translationally invariant characteristic value by use of at least one calculation specification. In a fuzzification step, the characteristic value is weighted with a least one indistinct affiliation function. A higher order affiliation function is determined from the at least one affiliation function during an interference step. During defuzzification, a sympathetic value is determined from the higher order affiliation function and is compared with a threshold value. A class affiliation is then decided from this comparison.

An advantage of the present invention lies, in particular, in that a sensor signal is analyzed in an image window of the size of n×n pixels. As a result of this, it is possible to consider the sensor signal of this image window to be local. The image analysis method in accordance with the present invention can be divided into the following substantial steps: characteristics formation, fuzzyfying, interference, defuzzyfying and decision regarding the class affiliation.

In the course of characteristics formation, the sensor signal is converted, by the use of at least one calculation specification, into an invariant, and in particular into a translation-invariant, signal in the characteristic space. It is the aim of the characteristics formation to define those values by which typical signal properties of the image content are characterized. The typical signal properties of the image content are represented by so-called characteristics. In this case, the characteristics can be represented by values in the characteristic space, or by linguistic variables. A signal is formed by transferring the sensor signal into the characteristic space, which consists of one characteristic value or of several characteristic values.

The affiliation of a characteristic value with a characteristic is described by at least one indistinct affiliation function. This is a soft or indistinct affiliation, wherein the affiliation of the characteristic value with the characteristic exists as a function of the characteristic value in a standardized interval between 0 and 1. The concept of the affiliation function leads to a characteristic value no longer totally, or not at all, being capable of being affiliated with a characteristic, but which instead can take on a fuzzy affiliation, which is located between the Boolean logical functions 1 and 0. The above-described step is called fuzzyfication. Thus, in the course of fuzzyfication, a conversion of a definite characteristic value into one or into several indistinct affiliations substantially takes place.

In connection with the interference step, a higher order affiliation function is generated by use of a calculation specification consisting of at least one rule, wherein all of the affiliation functions are linked to each other. As a result, a higher order affiliation function is therefore obtained for each image window.

In connection with the defuzzyfication step, a number value, also called a sympathetic value, is determined from the higher order affiliation function formed during interference. In the course of the decision regarding class affiliation, a comparison of the sympathetic value with a previously fixed threshold value takes place, by which comparison the affiliation of the window with a defined class is decided.

What type the characteristic values in the characteristic space are is of lesser importance for the principle of the present invention. Thus, for example, in connection with time signals, there is the possibility to set the mean value or the variance as characteristic values. If it is required of the evaluation process that it can process the image contents free of errors, regardless of the respectively prevailing signal intensity, and if furthermore small, but permissible fluctuations in the image signal do not lead to interference, it is useful if the conversion of the sensor signal from the two-dimensional local space is performed by the use of a two-dimensional spectral transformation, such as, for example, a two-dimensional Fourier, or a two-dimensional Walsh, or a two-dimensional Hadamard, or a two-dimensional circular transformation. Invariant characteristic values are obtained by the use of the two-dimensional spectral transformation. A further preferred embodiment of the present invention consists in using the amount of the spectral coefficient obtained by the spectral transformation as the characteristic value.

In a preferred embodiment of the present invention, the affiliation functions are unimodal potential functions, and the higher order affiliation function is a multimodal potential function.

In accordance with a further preferred embodiment of the present invention, at least one affiliation function is parametrized. If the affiliation function has positive and negative slopes, it is advantageous if it is possible to determine the positive and negative slopes separately. An improved matching of the parameters to the data sets to be examined is assured by this.

In accordance with a particularly preferred embodiment of the present invention, the method for evaluating the images of the electronic image sensor can be divided into a learning phase and a working phase. If the affiliation functions are parametrized, it is possible, in the learning phase, to determine the parameters of the affiliation functions from measured data sets. In the learning phase, the parameters of the affiliation functions are adapted to so-called reference images, i.e. during the learning phase an affiliation of the characteristic values resulting from the reference images with the respective characteristics is derived by the use of the affiliation functions and their parameters. In the subsequent work phase, the characteristic values resulting from the now measured data sets are weighted with the affiliation functions whose parameters had been determined in the learning phase, from which step an affiliation of the characteristic values of the now measured data sets with the corresponding characteristics is produced. By dividing the method into a learning phase and a work phase, the parameters of the affiliation functions are determined by the use of measured reference data sets. In the subsequent work phase, the measured data sets, which are to be tested, are weighted with the affiliation functions fixed during the learning phase, and are then evaluated.

In accordance with a further preferred embodiment of the present invention, at least one rule by which the affiliation functions are linked with each other, is a conjunctive rule within the meaning of an IF . . . THEN linkage.

A further preferred embodiment of the present invention subdivides the generation of the higher order indistinct affiliation functions into the processing of the partial steps: premise evaluation, activation and aggregation. In this case, in the premise evaluation partial step, an affiliation value is determined for each IF portion of a rule, and during the activation step, an affiliation function is fixed for each IF . . . THEN rule. Thereafter, during the aggregation step, the higher order affiliation function is generated by superimposing all of the affiliation functions created during the activation step.

In accordance with a further preferred embodiment of the present invention, the sympathetic value determination is performed, in particular, in accordance with a main emphasis and/or a maximum method.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
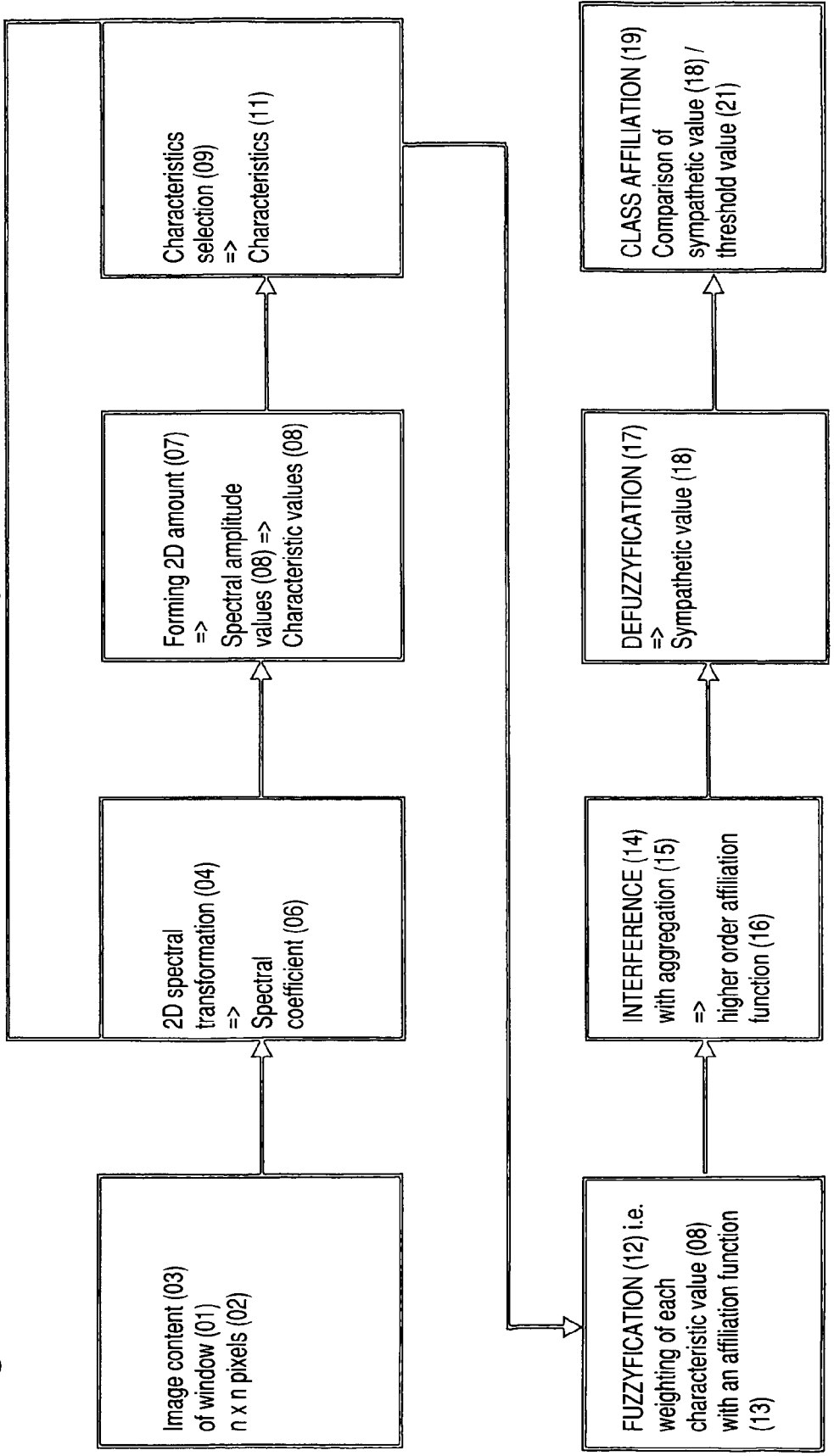
FIG. 1, a flow diagram of the signal evaluation method in accordance with the present invention, in FIG. 2, a sympathetic curve, in FIG. 3a, a difference function of the power of D=8, in FIG. 3b, a difference function of the power of D=4, and in FIG. 3c, a difference function of the power of D=2

A flow diagram of the signal evaluation method to be described in what follows, in accordance with the present invention, is shown in FIG. 1. In the method for signal evaluation of image contents of a test body, a grid of N×N windows 01 is placed over the entire image to be analyzed. Each window 01 here consists of n×n pixels 02. In the course of the image analysis, the signal from each window 01 is analyzed separately. As a result, the image content 03 of each window 01 can be considered to be local.

The two-dimensional image of the local space is transformed into a two-dimensional image in the frequency space by one or by several spectral transformations. The spectrum obtained is called a frequency spectrum. Since this is a discrete spectrum in the present preferred embodiment, the frequency spectrum is also discrete. The frequency spectrum is constituted by the spectral coefficients 06, which are also called spectral values 06.

In the subsequent method step, the amount formation 07 of the spectral values 06 takes place. The amounts of the spectral values 06 are called spectral amplitude values 08. In the present preferred embodiment, the spectral amplitude values 08 constitute the characteristic values, i.e. they are identical to the characteristic values.

A circular transformation is preferably used for the transformation. With the circular transformation, the invariance properties can be adjusted via the transformation coefficients. It is possible to set a translation invariance, as well as a reflection invariance, or an invariance with respect to different other permutation groups. In this way, it is possible to utilize the above mentioned transformation, for example, in the reflection-variant variation for inspecting characters. Consider the differentiation between the numbers "9" and "6". In the same way, the reflection-invariant variation can be used for inspecting workpieces, since here it is not necessary, in particular, to make a differentiation between a reflected part and the original. It should be mentioned that the amount spectrum of the Fourier transformation is reflection-invariant.

These transformations work with real coefficient values. It is therefore not necessary to utilize a complex calculation, as with the Fourier transformation.

The circular transformation is extremely tolerant, even in the sub-pixel range, in connection with any arbitrary displacements. Comparisons have shown that this circular transformation is superior to other known transformations in regard to displacements.

The number of work coefficients (characteristics, features) is small, because the spectral coefficients are again combined in groups.

The tolerance to displacements is created by the combination. Even if a signal runs partially out of a measurement field, the characteristics remain relatively stable. Tests have shown that stability is maintained, even if the image contents lie outside of the measurement field by up to approximately 30%.

The characteristic selection 09 follows as a further method step. The aim of the characteristic selection 09 is to select the characteristics 11, which are characteristic for the image content 03 of the image to be analyzed. Characteristic spectral amplitude values 08, which define the characteristic 11 by their position in the frequency space and by their amplitude, are possible as characteristics 11. Linguistic variables, such as "gray", "black" or "white", are also possible as characteristics 11.

In the next method step, the fuzzyfication step 12, the affiliation of each spectral amplitude value 08 with a characteristic 11 is fixed by the use of a soft or an indistinct affiliation function 13. In other words, weighting is performed.

If it is intended, during a learning phase, to match the affiliation functions 13 to so-called reference data sets, it is useful if the affiliation functions 13 are parametrized monomodal, i.e. are one-dimensional potential functions, wherein the parameters of the positive and negative slopes can be matched separately to the data sets to be examined. In the work phase, which follows the learning phase, the data sets of the image content, from which the characteristic values 08 of the test images result, are weighted with the respective affiliation functions 13 whose parameters had been determined in the previous learning phase. This means that, for each characteristic 11, a sort of TARGET-ACTUAL comparison between the reference data set, expressed in the parameters of the affiliation function 13, and the data set of the test image takes place. A soft or indistinct affiliation between the respective characteristic value 08 and the characteristic 11 is made by use of the affiliation functions 13.

In the next method step, the interference step 14, a conjunctive linkage 15, also called aggregation 15, of all affiliation functions 13 of the characteristics 11 takes place. A higher order affiliation function 16 is thus created or formed.

The next method step, the defuzzyfication step 17, determines a concrete affiliation or sympathetic value 18 from the higher order affiliation function 16. During the classification 19, this sympathetic value 18 is compared with a previously set threshold value 21, so that a classification statement can be made. The threshold value 21 is set either manually or automatically. Setting of the threshold value 21 takes also place during the learning phase.

During the classification, a numerical value is not assigned directly to a defined class by the use of a true or false statement. A unimodal function is set instead, which function describes an affiliation with a true or false statement.

In the course of this, the class affiliation is trained, i.e. the decision curves are taught by the use of measured values determined during the process. The functions by which a degree of affiliation is determined, are called affiliation functions $ZGF=\mu(m_x)$. The calculated value of the affiliation function ZGF is called a sympathetic value $\mu$. Several affiliation functions ZGF are often used, which are further combined in the subsequent steps in order to achieve an unequivocal statement.

However, this is specifically not a neuronal network being used. It is known that neuronal networks can be trained.

The fuzzy plate classification is based on a concept which simultaneously provides a distance measurement and a characteristic linkage. The "fuzzy" fact here is that the characteristics are "rounded off", not logically, but indistinctly. For one, this leads to all characteristics being summarily considered. This means that small deviations from a characteristic are still tolerated. If, secondly, the deviation from a characteristic becomes too large, this immediately has a large effect on the distance measurement. Accordingly, the output of the classificator does not provide a "good/bad" decision, but a continuous output value between. Thereafter a threshold value is used, which makes a "good/bad" decision possible.

The output value for the distance measurement (sympathetic value) is $\mu=2^{-z}$, wherein $$z = \frac{1}{M} \sum_{x=0}^{M-1} \left( \frac{|m_x - x_0(m_x)|}{C_x} \right)^D, 0 \leq z \leq 10, z > 10 \Rightarrow \mu(z) \equiv 0,$$

Here, the coefficients have the following meanings: x=counting index, z=averaged distance measurement, M=number of characteristics, $x_o$=mean value of $C_{diff}$, $C_x$=expansion value, D=power, $\mu$=sympathetic value, $C_{diff}$=difference measurement of the expansion value.

The expansion value C is taught with the aid of measured values which had been generated by the use of the circular transformation.

The $\mu$-value describes how close the similarity of a pattern is in relation to a reference pattern described by the characteristics. This means that the z-value takes over the actual control of the $\mu$-value. If the z-value is very small, the $\mu$-value is close to 1. The patterns are very similar, or are sympathetic. However, if the z-value is large, the $\mu$-value will become small. This indicates that the patterns are not similar. The course of the curve, as implemented, is represented in FIG. 2.

Initially, in the learning phase, the values $Cdiff_x$ are determined, namely for each characteristic $m_x$ one value:

$$Cdiff_x = \max(m_x) - \min(m_x)$$

wherein $C_{diff}$ is the difference measurement of the expansion value, and m are the characteristics.

During the inspection, the learned $C_{diff}$ values are used. The values can still be assigned an additional tolerance a. Settlement takes place during the running time:

$$C_x = (1+2p_{ce}) \max(m_x) - \min(m_x), a = (1+2p_{ce}) \qquad 2$$

wherein C is the expansion value and $P_{ce}$ is the percental tolerance of $C_{diff}$.

The value range of "a" lies between. The value $P_{ce}$ indicates the percental tolerance with which $C_{diff}$ is respectively charged. A 50% expansion of the range of $C_{diff}$ is intended to be achieved; in that case "a"=1+2*0.5=2.

The $x_o$ value indicates the mean value of $C_{diff}$; it is calculated for each characteristic during the running time.

The difference between the characteristic value and the mean characteristic value, which is determined from the value $C_x$, is calculated. This difference is standardized with the width of the expansion value $C_x$. The result is that, with a slight deviation, the corresponding characteristic contributes little to the z-value. However, with a large deviation, a large deviation value will result as a function of the difference measure of the expansion value $C_{diff}$. The standardized difference is called $d_x$.

Figure 3A:
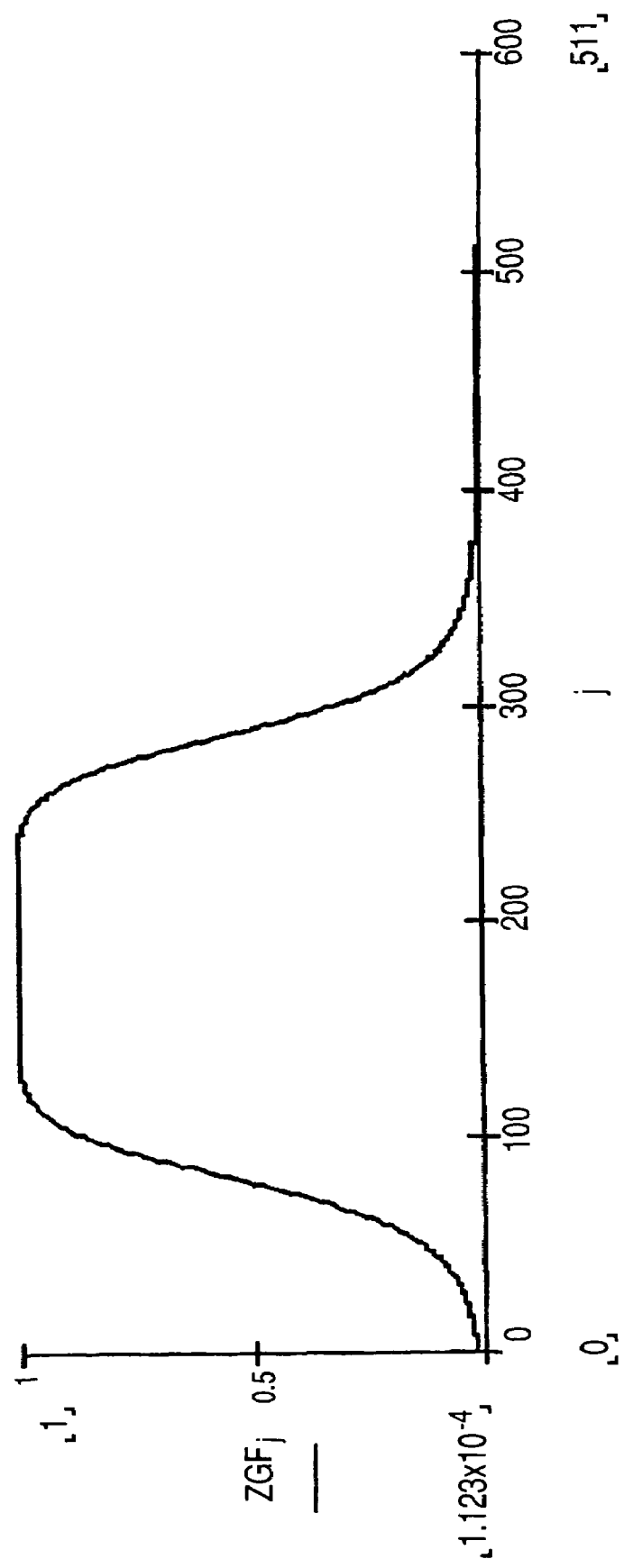
Figure 3B:
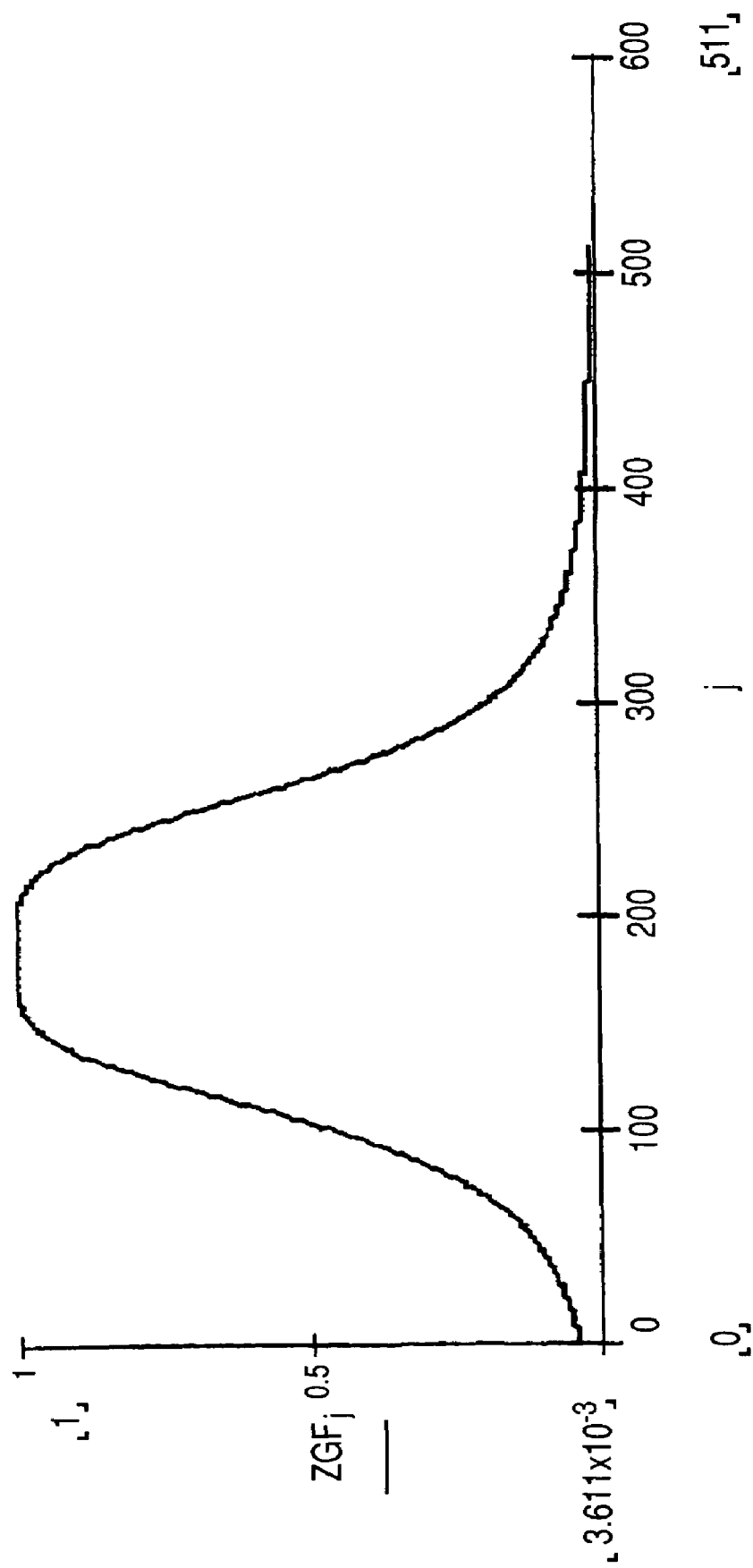
Figure 3C:
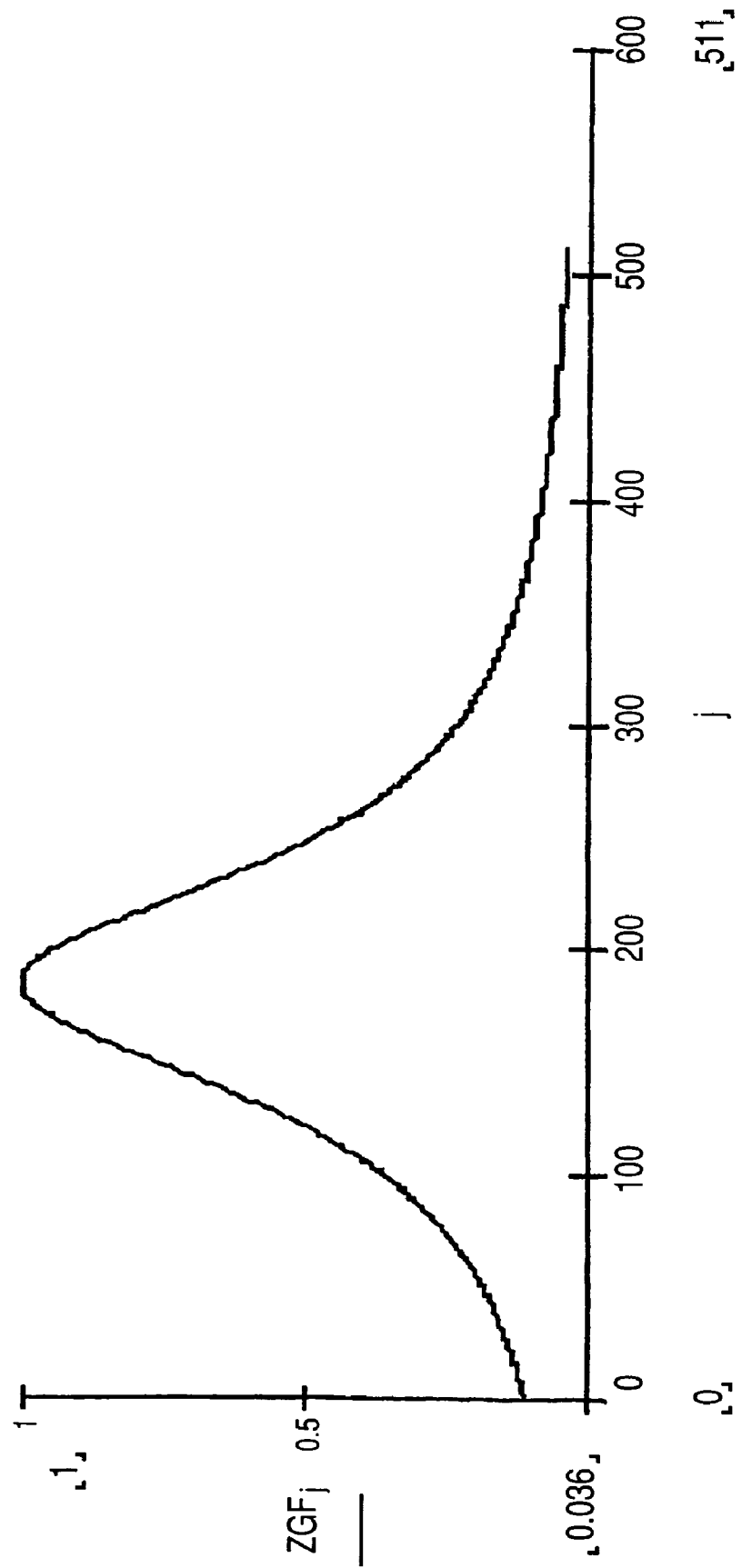

The power D (2, 4, 8) sets the sensitivity at the flanks of the standardized difference function $d_x$. If the value D is set to "infinity", which is not technically possible, an infinite flank steepness is also obtained, and therefore a hard good/bad decision is made. Therefore, the values are customarily set to between 2 . . . 20. The curves for the values 2, 4 and 8 are represented in FIGS. 3c, 3b and 3a.

The exponentiated functions $d_x$ are added up. However, only the number M of the characteristics m which have been switched on is used. Following the adding-up, the calculated value is divided by the number M. The mean value of all exponentiated differences $d_x$ is thus determined.

The effect is the following: because of the exponentiation, small deviations will not be important, but the importance of large ones will be increased. A deviation of all characteristic differences is calculated by averaging. This has the result that, even with the deviation of several characteristics, the µ-value is not drastically lowered. This value will become very small only with larger deviations.

A threshold value evaluation follows thereafter.

Good, if $\mu(z) \geqq \mu_s$ $\mu_{klass}$

Error, if $\mu(z) < \mu_s$

This process is performed for all windows.

An evaluation of dynamic processes, such a printing processes, requires non-linear distance measurements or sympathetic values.

While preferred embodiments of methods for evaluating the signals of an electronic image sensor during pattern recognition of image contents of a test piece, in accordance with the present invention, have been set forth fully and completely hereinabove, it will be apparent to one of skill in the art that various changes in, for example the specific image to be evaluated, the specific type of electronic image sensor used to receive the light input signal, and the like could be made without departing from the true spirit and scope of the present invention which is accordingly to be limited only by the following claims.

What is claimed is:

1. A method for signal evaluation of an electronic image sensor in the course of pattern recognition of the image content of a test body including;
   dividing the image of said test body into a group of N×N grid-like windows each of the size of n×n pixels;
   generating a multiple pixel output signal representing image content in an n×n pixel window within an N×N window of the image of said test body;
   analyzing the image content in one of said n×n pixel windows by converting said output signal into at least one invariant characteristic value using at least one calculation specification in the form of a two-dimensional mathematical spectral transformation method selected from the group comprising a Fourier, Walsh, Hadamard or circular transformation;
   defining two dimensional spectra from said image content;
   calculating spectral amplitude values from these two-dimensional spectra and linking together said spectral amplitude values;
   weighting said characteristic value with at least one indistinct affiliation function, said affiliation function being a functional connection with a value range of said characteristics value and a characteristic;
   generating a higher order indistinct affiliation function by conjunctive linking of all of said affiliation functions of said characteristic;
   determining one sympathetic value from said higher order affiliation function for each n×n pixel window, said sympathetic value defining a degree to which a characteristic in said image is similar to a reference characteristic;
   comparing said sympathetic value with a threshold value;
   deciding a class affiliation for said signal from said comparison of said sympathetic value and said threshold value; and
   wherein converting said output signal into at least one invariant characteristic value includes generating an invariant spectrum, and wherein the invariant property is adjustable by using transformation coefficients.

2. The method of claim 1 further including determining said sympathetic value using one of a main emphasis and a maximum method.

3. The method of claim 1 further including dividing said method into a learning phase and a work phase, using said learning phase for defining and matching at least one of a parameter and a threshold value, and, in said work phase, evaluating said image context of the test body and evaluating said image using results from said learning phase.

4. The method of claim 1 further including dividing said method into a learning phase and a work phase, using said learning phase for defining and matching at least one of a parameter and a threshold value, and, in said work phase, evaluating said image context of the test body and evaluating said image using results from said learning phase.

5. The method of claim 1 further including providing a learning phase and using said learning phase for teaching said affiliation function.

6. The method of claim 1 wherein each said affiliation function is a unimodal function.

7. The method of claim 1 wherein each said higher order affiliation function is a multimodal function.

8. The method of claim 1 wherein at least one said affiliation function and said higher order affiliation function is a potential function.

9. The method of claim 1 further including generating said higher order affiliation function by processing partial steps of premise evaluation, activation and aggregation, wherein, in said premise evaluation, an affiliation value is determined for each IF portion of a calculation specification, wherein, in said activation, an affiliation function is fixed for each IF . . . THEN calculation specification, and wherein, during said aggregation, said higher order affiliation function is generated by superimposing all of said affiliation function formed during said activation.

10. A method for evaluation of a multiple pixel output signal of an electronic image sensor in the course of pattern recognition of the image context of an image of a test body including;
   generating a multiple pixel image of said test body to be evaluated;
   dividing said image to be evaluated into N×N grid-like windows each having a size of n×n pixels;
   analyzing said image content of one of said windows of said size of n×n pixels;
   defining two-dimensional spectra from said image content; and
   forming a spectral transformation of said two-dimensional spectra using a circular transformation to generate a spectrum having invariance properties that are adjustable by the use of transformation coefficients for said circular transformation.

11. The method of claim 10 further including performing said circular transformation using real coefficients.

12. The method of claim 10 further including forming associated work coefficients by combining spectral coefficients in groups.

* * * * *